Oct. 2, 1962 R. P. SWANK ET AL 3,056,580
GAS TURBINE STARTER
Filed April 9, 1959 2 Sheets-Sheet 2

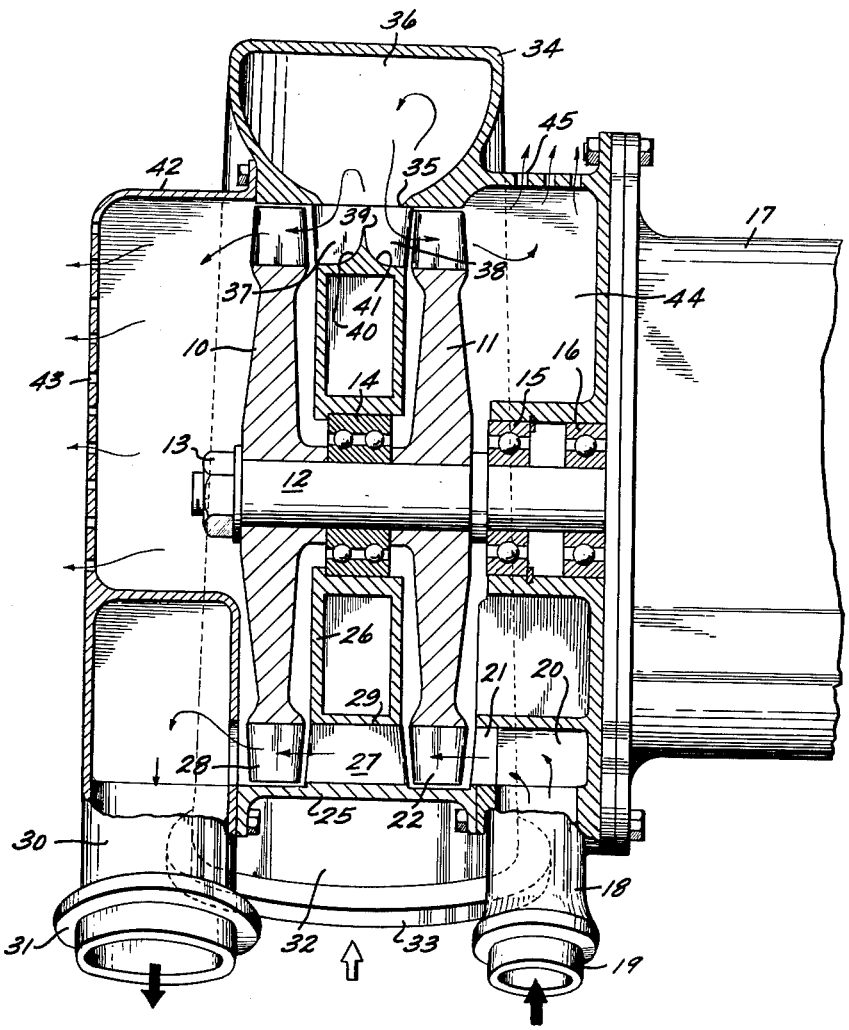

INVENTORS.
HARRY M. CRONER
ROLAND P. SWANK
BY
Lawrence G. Norris
ATTORNEY-

United States Patent Office 3,056,580
Patented Oct. 2, 1962

3,056,580
GAS TURBINE STARTER
Roland P. Swank, Berwyn, Pa., and Harry Marvin Croner, Cincinnati, Ohio, assignors to General Electric Company, a corporation of New York
Filed Apr. 9, 1959, Ser. No. 805,309
4 Claims. (Cl. 253—45)

My invention relates to gas turbine units and in particular to a gas turbine configuration capable of operation on either a high energy source such as hot gas or a low energy source such as compressed air.

As is well known in the art, it is a common practice to employ gas turbines for various auxiliary power purposes in aircraft and missiles. Such turbines may be employed, for instance, for the purpose of starting gas turbine engines, such as jet engines and turboprop engines; or, to give another example, for the purpose of driving accessories, such as electrical generators.

It is usually necessary to design such gas turbine units for a particular type of motive fluid source. For instance, it would generally be found that a turbine designed to operate on compressed air, such as a pneumatic starter, would not require as many turbine stages to efficiently extract the energy from the incoming gas as would a high energy hot gas type turbine unit. In addition, because of the lower density and lower energy content of a pneumatic or compressed air source, the flow area for the energy type unit is usually substantially larger than that required for the typical hot gas system.

Thus for most efficient operation, a multi-stage turbine configuration coupled with a relatively small flow area would generally be preferred for the hot gas type of turbine unit whereas, for the unit designed to operate on the lower energy type of source such as compressed air, a single turbine stage is generally adequate with the flow area being substantially greater than that provided for the hot gas system.

The foregoing conflicting requirements have generally made gas turbine units designed for operation on a high energy hot gas supply, such as a solid fuel system or the like, unsuitable for efficient operation on a low energy supply, such as compressed air. And similarly, a turbine having the proper flow area and the like for the relatively low energy compressed air type of system would be inefficient and in some cases inoperative with a high energy source such as a solid fuel cartridge or a fuel-air combustion system.

It is often desirable, however, to be able to operate such turbines from various types of motive fluid sources. For instance, it may be desirable to operate a gas turbine starter from a high energy hot gas source in one set of circumstances and from a low energy compressed air source in another. To give an example, in certain types of multi-engine jet aircraft it is considered advantageous to start one engine with a self-contained hot gas type turbine starter, and then use compressed air bled from the engine so started to supply motive power to the turbine starters on the remaining engines. Similarly, in the case of an auxiliary power unit designed to operate from a hot gas supply in a missile or aircraft application, it may be desirable to provide a ground check-out of the unit by operating it on a low energy motive fluid source such as compressed air. Thus, the provision of a single turbine configuration capable of operating efficiently on either a high energy or a low energy source has many advantages in terms of reduction in manufacturing costs by reason of the necessity for producing only a single design capable of wider application, greater flexibility of utilization and the like.

It is therefore an object of my invention to provide an improved gas turbine unit which is capable of operating efficiently on either compressed air or a hot gas supply such as a cartridge or a fuel-air combustion source.

Briefly stated. I accomplished this and other objects of my invention, in one embodiment thereof, by the provision of a multi-stage turbine together with two separate gas flow duct and nozzle arrangements, one duct and nozzle arrangement being connected to direct the gas through the turbine stages in series flow relationship and the other being connected to direct the gas through the turbine stages in a parallel flow relationship. The series flow arrangement is designed to provide the proper operating conditions in terms of flow area and the like for the hot gas type of source whereas the parallel flow system is designed for use with a compressed air type source. Thus, I provide a single turbine design which is capable of efficient operation on either high energy or low energy sources of supply.

Other objects and advantages of my invention will be apparent from the following description taken in connection with the accompanying drawings, in which:

FIG. 1 is an elevational view, taken partly in cross section, of the turbine drive section of a gas turbine starter embodying my invention;

FIG. 2 is a projected view of the diaphragm vane and turbine bucket arrangement of the turbine shown in FIG. 1.

Figure 3:
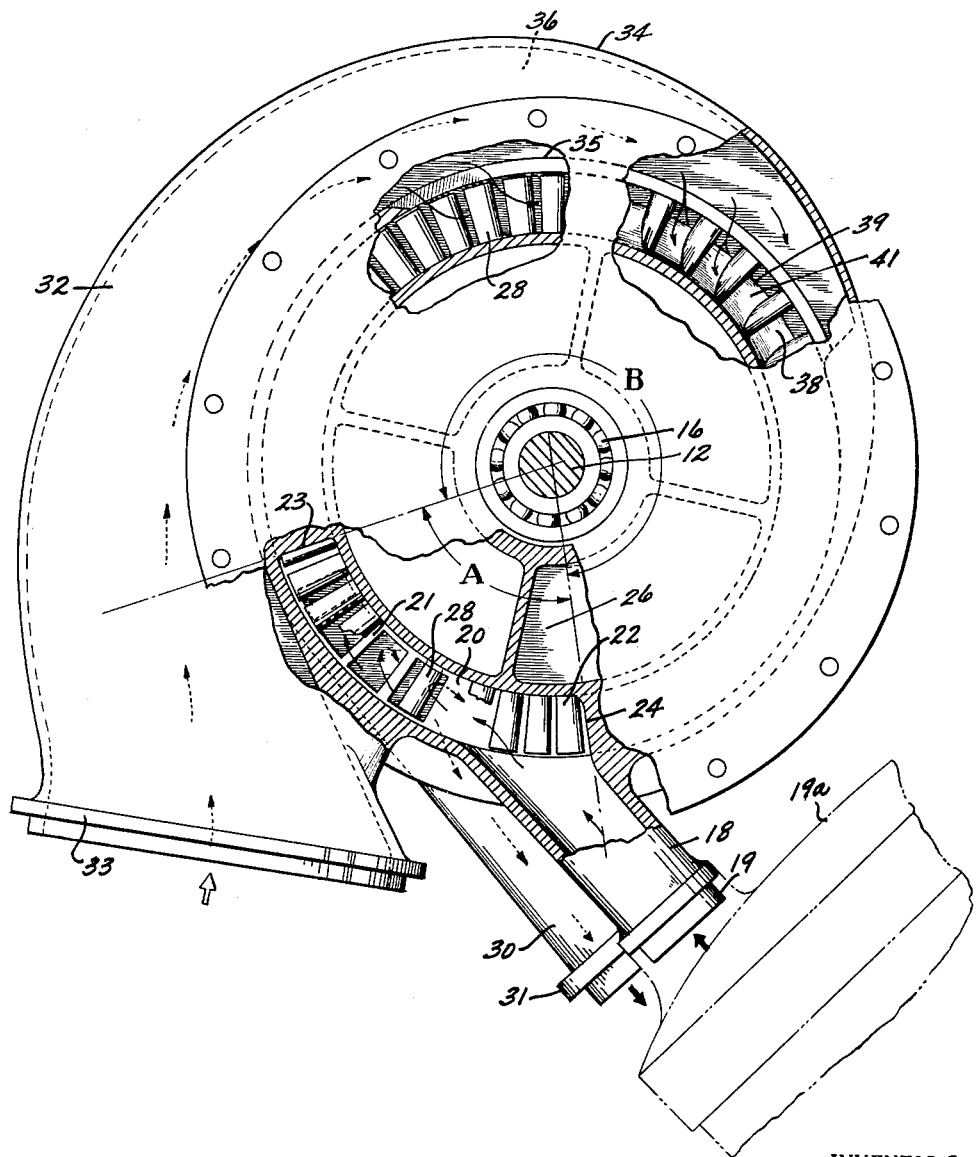
FIG. 3 is an end view of the starter shown in FIG. 1 showing a typical connection to a cartridge type of hot gas source.

Referring now to FIG. 1, there is shown a gas turbine unit in the form of a starter having a multi-stage turbine power unit comprising turbine wheels 10 and 11 mounted on and secured to a shaft 12 by means of a key (not shown) and a nut 13. The shaft 12 is rotatably mounted in bearings 14, 15 and 16 and extends into a gear box 17. The gear box 17 is provided with an output shaft (not shown) which is connectible to the starter input mechanism of a gas turbine engine in the usual manner to permit the turbine power unit to drive the engine up to starting speed through the gear reduction provided by the gear box 17 and what ever additional gear ratio that may be provided between the engine rotor and the starter input pad.

In the turbine power unit we provide two separate flow paths and flow arrangements, one being suitable for operation on a low energy source such as a compressed air or pneumatic supply and the other being suitable for operation on a high energy source such as a hot gas supply. In the embodiment shown in FIGS. 1 and 2 this is accomplished, referring first of all to the hot gas flow system, by providing an inlet duct or conduit means 18 connectible at 19 to a hot gas source such as the combustion chamber of a fuel-air system or to the breech 19a of a cartridge system.

The conduit 18 communicates with an arcuately shaped chamber or nozzle box 20 which is provided with a series of nozzle vanes 21 positioned to direct the hot gases against the turbine 11. The turbine wheel 11 is provided with a series of buckets 22 against which the hot gases issuing from the nozzle vanes 21 are directed. As shown in FIG. 3, the chamber 20 and the nozzle vanes 21 extend over only a portion A of the total available arc, the peripheral ends of the chamber 20 being defined by radially extending walls 23 and 24. It is generally found in hot gas types of starters that when the turbine wheel is sized to achieve the desired pitch line velocity and to utilize reasonable bucket heights, somewhat less than half the total available arc is required. It would therefore be expected that the hot gas arc represented by the chamber 20 would normally be less than half the total available arc although this is not critical to the operation of our invention as will later be explained.

Located intermediate the turbine wheels 10 and 11 and supported by an intermediate casing member 25 is a diaphragm member 26. The diaphragm 26 carries a series of vanes 27 thereon which are shaped generally as shown in FIG. 2 so as to receive gases discharged from the buckets 22 of the first stage turbine wheel and redirect them against buckets 28 of the second stage turbine wheel 10.

Over a portion of the arc corresponding approximately to that over which the chamber 20 extends but displaced angularly by a small amount to take into account the angular increment traveled by the gases, the inner surface of the flow path through the vanes 27 is defined by a cylindrical surface 29 on the diaphragm. Upon leaving the second stage turbine buckets 28, the gases are ducted out through a conduit 30, which may form the exhaust duct or which may be connected to a suitable exhaust duct at 31. Thus the flow path for the hot gas system extends from the inlet conduit 18 through the partial arc inlet comprising the nozzle box 20 and nozzle vanes 21, the first stage turbine buckets 22, the diaphragm vanes 27, the second stage turbine buckets 28 and then out to exhaust through the conduit 30.

With respect now to the pneumatic portion of the starter, there is provided an inlet duct 32 which is connectible at 33 to a source of compressed air such as a ground cart compressor or the compressor of a gas turbine engine. The inlet duct 32 blends into an inlet scroll 34 which is provided with a peripherally extending opening 35 along its inner side establishing fluid communication over a portion of the arc between the interior 36 of the scroll and the spaces between the diaphragm nozzle vanes 27.

Over a portion of the arc corresponding substantially to the sector occupied by the opening 35, the spaces between the vanes 27 are divided into oppositely directed passages 37 and 38 by means of a radially extending wall or flow splitter 39 having curved sides 40 and 41 on either side thereof. Gases directed radially inward through opening 35 are deflected by the curved surfaces 40 and 41 and are directed in opposite axial directions, the gases flowing through the passages 37 being directed against the buckets 28 of the wheel 10 and the gases flowing through the passages 38 being directed against the buckets 22 of the wheel 11. Thus, the passages 37 and 38 form a parallel flow arrangement wherein the incoming flow is split and directed through parallel flow paths against the two turbine wheels.

The gases flowing from passages 37 through the buckets 28 are discharged into an exhaust hood 42, which is vented to the surrounding atmosphere through a series of apertures 43 in the hood. Gases flowing from the passages 38 through the buckets 22 are discharged into an exhaust chamber 44, which is vented to atmosphere through apertures 45.

Thus, the parallel flow path provided for operation on pneumatic or other low energy systems extends through the inlet scroll passage 36, the inlet opening 35, the parallel flow passages 37 and 38 and then through the two turbine stages 10 and 11 in parallel. The opening 35 and the flow splitting wall 39 extend over the portion of the available nozzle arc not occupied by the hot gas portion of the system, that is, the nozzle arc B as seen in FIG. 3. Thus, it will be seen that the total available nozzle flow area is equal to twice the area of the nozzle sector B for a single stage configuration of the same diameter and nozzle height.

It will be seen from the foregoing description that our invention provides a gas turbine arrangement which is operable either on a high energy source, such as a hot gas system, or a low energy source such as a compressed air system. In addition, the arrangement of our invention allows the particular requirements of each type of system, such as the reduced flow area multi-stage requirements of the hot gas system and the high flow area single stage characteristic of the pneumatic system, to be satisfied. Although we have shown and described a gas turbine starter embodying our invention, it will be realized that our invention may be applied to other types of gas turbine units, such as auxiliary power units and the like. It will also be appreciated that our invention may be applied in turbine arrangements utilizing more than two stages wherein the high energy flow path would be directed through the turbine stages in series and the low energy flow path would be directed, through the remainder of the nozzle arc, through the turbine stages in a parallel flow arrangement. It will also be apparent that various other modifications and changes may be made in the embodiment presented herein without departing from the true scope and spirit of our invention as we have defined it in the appended claims.

What we claim as new and desire to secure by Letters Patent is:

1. A gas turbine unit comprising a turbine having at least two turbine stages, first inlet nozzle means extending over a first portion of the available flow area of said turbine adjacent the first of said two turbine stages, an interstage diaphragm mounted between said turbine stages and having fluid passages shaped to receive flow discharged from the first turbine stage and to direct the flow to the second turbine stage to provide a series flow path through said turbine stages, and second inlet nozzle means extending over a second portion of the available flow area of said turbine intermediate said turbine stages and having nozzle passages directed in opposite directions at said turbine stages for directing motive fluid against said turbine stages in parallel flow relationship.

2. A gas turbine unit comprising a turbine having at least two axial flow turbine stages, inlet nozzle means extending over a first portion of the available flow arc of said turbine adjacent the first of said two turbine stages, an interstage diaphragm mounted between said turbine stages and having fluid passages shaped to receive flow discharged from the first turbine stage and to redirect the flow to the second turbine stage to provide a series flow path through said turbine stages, second inlet nozzle means extending over a second portion of the available flow arc of said turbine and having nozzle passages directed axially in opposite directions at said turbine stages for directing motive fluid against said turbines in parallel flow relationship, inlet passage means connected to said second inlet nozzle means, and flow splitting means in said inlet passage means for dividing the flow of inlet motive fluid to said oppositely directed nozzle passages.

3. A gas turbine unit comprising a turbine having at least two turbine stages, inlet nozzle means extending over a first portion of the available flow area of said turbine adjacent the first of said two turbine stages, an interstage diaphragm mounted between said turbine stages and having passages therein shaped to receive flow discharged from the first turbine stage and to redirect the flow to the second turbine stage to provide a series flow path through said turbine stages, means for directing motive fluid into said diaphragm passages over a second portion of the available flow area of said turbine, and flow splitting means in said diaphragm for dividing said flow and directing it through said diaphragm passages against said turbine stages in parallel fluid flow relationship.

4. A gas turbine unit comprising a turbine having at least two aixal flow turbine stages, inlet nozzle means connectible to a first motive fluid source extending over a first portion of the available flow arc of said turbine adjacent the first of said two turbine stages, an interstage diaphragm mounted between said turbine stages and having passages therein shaped to receive flow discharged from said first turbine stage and to redirect the flow to said second turbine stage to provide a series flow path through said turbine stages, means for directing motive fluid from a second motive fluid source radially inwardly into said diaphragm passages over a second portion of the available flow arc of said turbine, and flow splitting means extending radially into said diaphragm passages over said second arc portion for dividing incoming motive fluid flow and directing it in opposite axial directions through said diaphragm passages and against said turbine stages in parallel flow relationship.

References Cited in the file of this patent

UNITED STATES PATENTS

| | | |
|---|---|---|
| 641,074 | Burgum | Jan. 9, 1900 |
| 910,170 | Callan | Jan. 19, 1909 |
| 969,869 | Hodgkinson | Sept. 13, 1910 |
| 1,061,670 | Herr | May 13, 1913 |
| 2,184,661 | Bentley | Dec. 26, 1939 |
| 2,394,125 | Warren | Feb. 5, 1946 |
| 2,435,042 | Johansson | Jan. 27, 1948 |
| 2,959,919 | Chiere et al. | Nov. 15, 1960 |

FOREIGN PATENTS

| | | |
|---|---|---|
| 544,981 | Germany | Feb. 24, 1932 |
| 1,126,306 | France | Nov. 20, 1956 |